(12) United States Patent
Van De Ven et al.

(10) Patent No.: US 8,112,752 B2
(45) Date of Patent: Feb. 7, 2012

(54) METHOD FOR PERFORMING A SOFTWARE PROCESS, CONTROLLER AND LITHOGRAPHIC APPARATUS

(75) Inventors: Johannes Theodorus Guillielmus Maria Van De Ven, Eindhoven (NL); Robbert Jaap Van Der Kruk, Valkenswaard (NL)

(73) Assignee: ASML Netherlands B.V., Veldhoven (NL)

( * ) Notice: Subject to any disclaimer, the term of this patent is extended or adjusted under 35 U.S.C. 154(b) by 1360 days.

(21) Appl. No.: 11/175,035

(22) Filed: Jul. 6, 2005

(65) Prior Publication Data
US 2007/0011677 A1   Jan. 11, 2007

(51) Int. Cl.
G06F 9/46      (2006.01)
G06F 19/00    (2011.01)

(52) U.S. Cl. ........ 718/102; 718/100; 718/103; 718/104; 700/121

(58) Field of Classification Search .................. 718/100, 718/102–104; 700/121
See application file for complete search history.

(56) References Cited

U.S. PATENT DOCUMENTS

| | | | |
|---|---|---|---|
| 5,588,152 A | | 12/1996 | Dapp et al. |
| 6,470,375 B1 * | | 10/2002 | Whitner et al. ............... 718/105 |
| 6,745,094 B1 * | | 6/2004 | Harakawa et al. ............ 700/121 |
| 7,289,867 B1 * | | 10/2007 | Markle et al. ................. 700/121 |
| 2005/0043834 A1 * | | 2/2005 | Rotariu et al. ................... 700/95 |
| 2005/0102723 A1 | | 5/2005 | Van Den Nieuwelaar et al. |
| 2006/0085793 A1 * | | 4/2006 | McKenney ..................... 718/100 |
| 2007/0074216 A1 * | | 3/2007 | Adachi et al. ................. 718/102 |

FOREIGN PATENT DOCUMENTS

| | | | |
|---|---|---|---|
| JP | 4-171538 A | | 6/1992 |
| JP | 10-133890 A | | 5/1998 |
| JP | 2005071171 A | * | 3/2005 |
| JP | 2005-123608 A | | 5/2005 |
| KR | 2005120163 A | * | 12/2005 |

OTHER PUBLICATIONS

English Translation of Notice of Reasons for Rejection for Japanese Patent Application No. 2006-185875 mailed Jan. 19, 2009, 4 pgs.

* cited by examiner

*Primary Examiner* — Kenneth Tang
(74) *Attorney, Agent, or Firm* — Sterne, Kessler, Goldstein & Fox P.L.L.C.

(57) ABSTRACT

A method for performing a software process, such as a real time software process, is disclosed, the process having a plurality of tasks, the method including starting a task of the plurality of tasks of the process, monitoring a progress of the started task, comparing the progress with a desired progress, if the progress does not meet the desired progress, skipping at least a part of a task of the plurality of tasks, and performing the process making use of an outcome of the tasks which have been completed. The monitoring of the progress may be performed upon completion of the task or at a predetermined moment in time.

32 Claims, 5 Drawing Sheets

Feedforward shortstroke

Controller (e.g. PID)

long stroke

Fig. 5

METHOD FOR PERFORMING A SOFTWARE PROCESS, CONTROLLER AND LITHOGRAPHIC APPARATUS

1. FIELD

The present invention relates to a method for performing a software process, a controller and a lithographic apparatus comprising program instructions to perform the method.

2. BACKGROUND

A lithographic apparatus is a machine that applies a desired pattern onto a substrate, usually onto a target portion of the substrate. A lithographic apparatus can be used, for example, in the manufacture of integrated circuits (ICs). In such a case, a patterning device, which is alternatively referred to as a mask or a reticle, may be used to generate a circuit pattern to be formed on an individual layer of the IC. This pattern can be transferred onto a target portion (e.g. including part of, one, or several dies) on a substrate (e.g. a silicon wafer). Transfer of the pattern is typically via imaging onto a layer of radiation-sensitive material (resist) provided on the substrate. In general, a single substrate will contain a network of adjacent target portions that are successively patterned. Conventional lithographic apparatus include so-called steppers, in which each target portion is irradiated by exposing an entire pattern onto the target portion at once, and so-called scanners, in which each target portion is irradiated by scanning the pattern through a radiation beam in a given direction (the "scanning"-direction) while synchronously scanning the substrate parallel or anti-parallel to this direction. It is also possible to transfer the pattern from the patterning device to the substrate by imprinting the pattern onto the substrate.

In a lithographic apparatus, as well as in many other applications, real time software may be applied. The term real time software may be understood here as software which performs a task and/or provides an output in a time relation to another activity. In other words, a correctness of operation of real time software not only depends upon a logical correctness of an outcome of the software, but also upon the time at which the outcome of the software is provided. The other activity might be a physical process being related to any type of physical quantity, such as a positioning of a movable part of a lithographic apparatus or other device, or illumination by a source of radiation, an overall control system which requires data from the process at a certain moment in time, a control of any type of machine such as a lithographic apparatus, an engine, etc., any type of communication equipment such as telecommunication equipment or computer network equipment in which certain data is provided at predetermined moments in time, etc. The term software is to be understood as comprising any type of program instructions suitable to be executed by any type of processing means such as a microprocessor, microcontroller, digital signal processor, or any other type of programmable device such as a programmable integrated circuit. It is common that a processing means which is to run the software is loaded with a variety of processes or other activities. It might, for example, be the case that the processing means is in a multi-tasking environment, thus is required to perform a plurality of processes. Therefore, the processing means will in turn perform some activities for each of the processes. In general, due to various reasons, a load on the processing means may vary over time, which may cause the providing of an output of a process in question to become time critical. It might even be the case that, due to a high load on the processor such as by sudden events, additional tasks, or other reasons such as missing data in a cache memory, a command given to the process or another process to be executed by the same processing means, etc., that a time spent by the processing means on a certain process or a part of a process, may vary. Therefore, it may happen that a calculation time exceeds an expected time, which may lead to the situation that a result of (a part of) a process is available at a moment which is too late in-time. This may be undesirable as any activity with which the process interacts may be degraded in performance thereof due to such a delay.

As an example, a software process may comprise a control process, e.g. to control a servo-control loop, such as a servo control of a substrate table in a lithographic apparatus. In this example, the controlling may be performed by a software process running on a processing means. In case that, because of any reason, an output of the process is late, this may firstly affect a performance of a positioning of the substrate table, as a variety of forces which may act on the substrate table, such as forces by motors which drive the substrate table and/or a variety of disturbance forces, will continue to act on the substrate table, thus having an effect on the position, velocity, acceleration, etc. thereof. Further, a varying delay in the process may have an adverse effect on stability, dynamic performance and other characteristics of the servo loop.

3. SUMMARY

It is desirable to improve a timing and/or a performance of a software process.

According to an embodiment of the invention, there is provided a method for performing a software process, the process comprising a plurality of tasks, the method comprising starting a task of the plurality of tasks of the process, monitoring a progress of the started task, comparing the progress with a desired progress, if the progress does not meet the desired progress, skipping at least a part of a task of the plurality of tasks, and providing an output of the process making use of an outcome of the tasks which have been completed.

In another embodiment of the invention, there is provided a method for performing a software control process in a lithographic apparatus, the process comprising a plurality of tasks, the method comprising starting a task of the plurality of tasks of the process, monitoring a progress of the started task, comparing the progress with a desired progress, if the progress does not meet the desired progress, skipping at least a part of a task of the plurality of tasks, and providing an output of the process making use of an outcome of the tasks which have been completed.

According to a further embodiment of the invention, there is provided a controller configured to perform a software process, the software process comprising a plurality of tasks, the controller comprising program instructions to perform the method according to an embodiment of the invention.

According to a still further embodiment of the invention, there is provided a lithographic apparatus comprising a controller configured to perform a software process, the software process comprising a plurality of tasks, the controller comprising program instructions to perform the method according to an embodiment of the invention.

4. BRIEF DESCRIPTION OF THE DRAWINGS

Embodiments of the invention will now be described, by way of example only, with reference to the accompanying schematic drawings in which corresponding reference symbols indicate corresponding parts, and in which.

Figure 2:
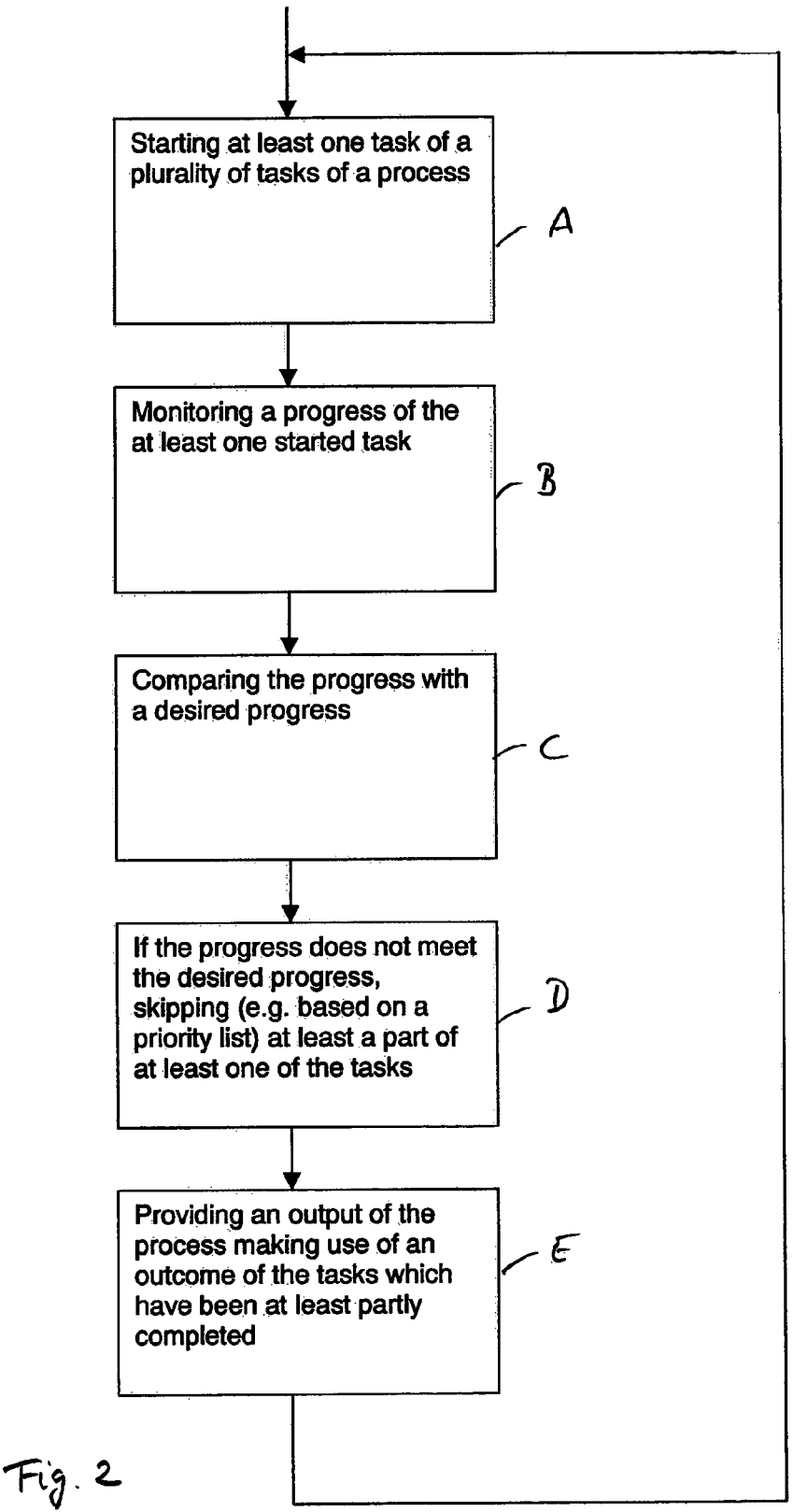
FIG. 2 depicts a flow diagram of a method according to an embodiment of the invention.
Figure 3A:
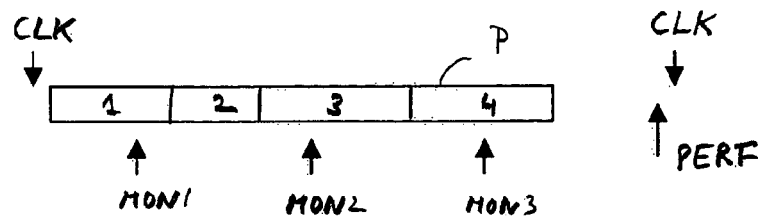
Figure 3B:
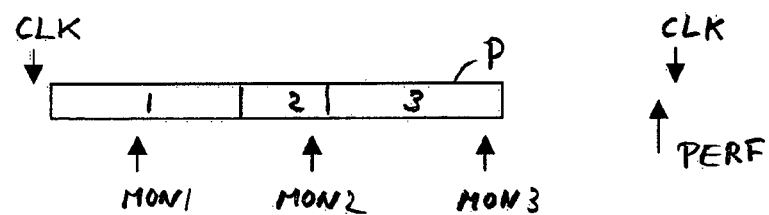
Figure 3C:
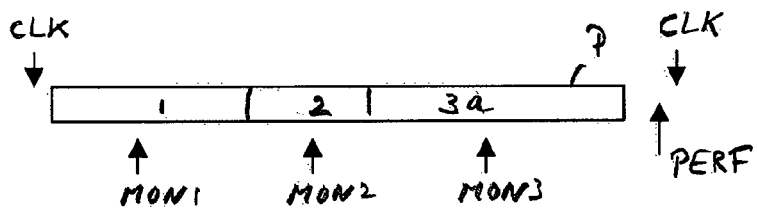
Figure 4A:
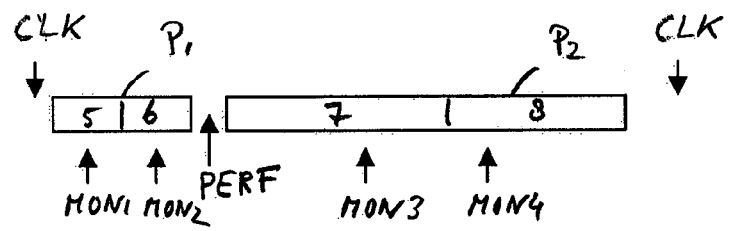
Figure 4B:
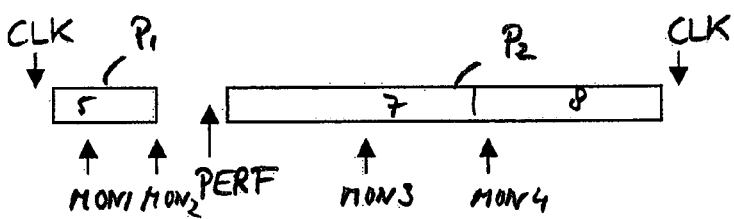
Figure 4C:
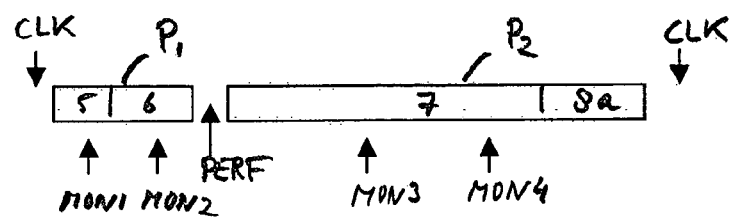
Figure 6A:
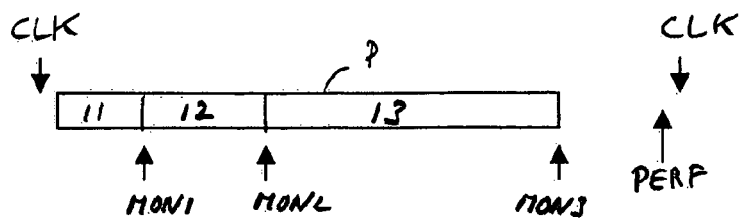
Figure 6B:
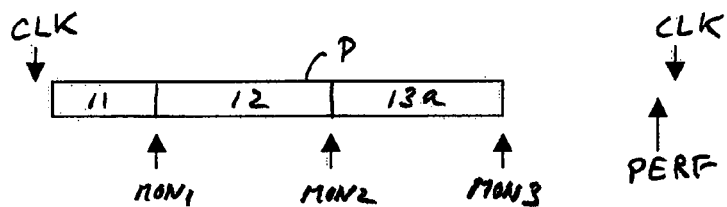
Figure 6C:
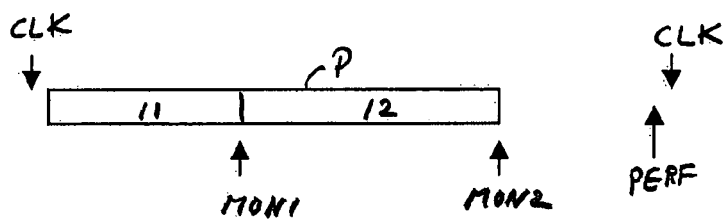

FIGS. 3A-C schematically depict a timing diagram of the performance of an example of the method as described with reference to FIG. 2;

FIGS. 4A-C schematically depict a timing diagram of the performance of another example of the method as described with reference to FIG. 2;

FIG. 5 depicts a priority list according to an example of the method as described with reference to FIG. 2; and FIGS. 6A-C schematically depict a timing diagram of the performance of a further example of the method as described with reference to FIG. 2.

5. DETAILED DESCRIPTION

Figure 1:
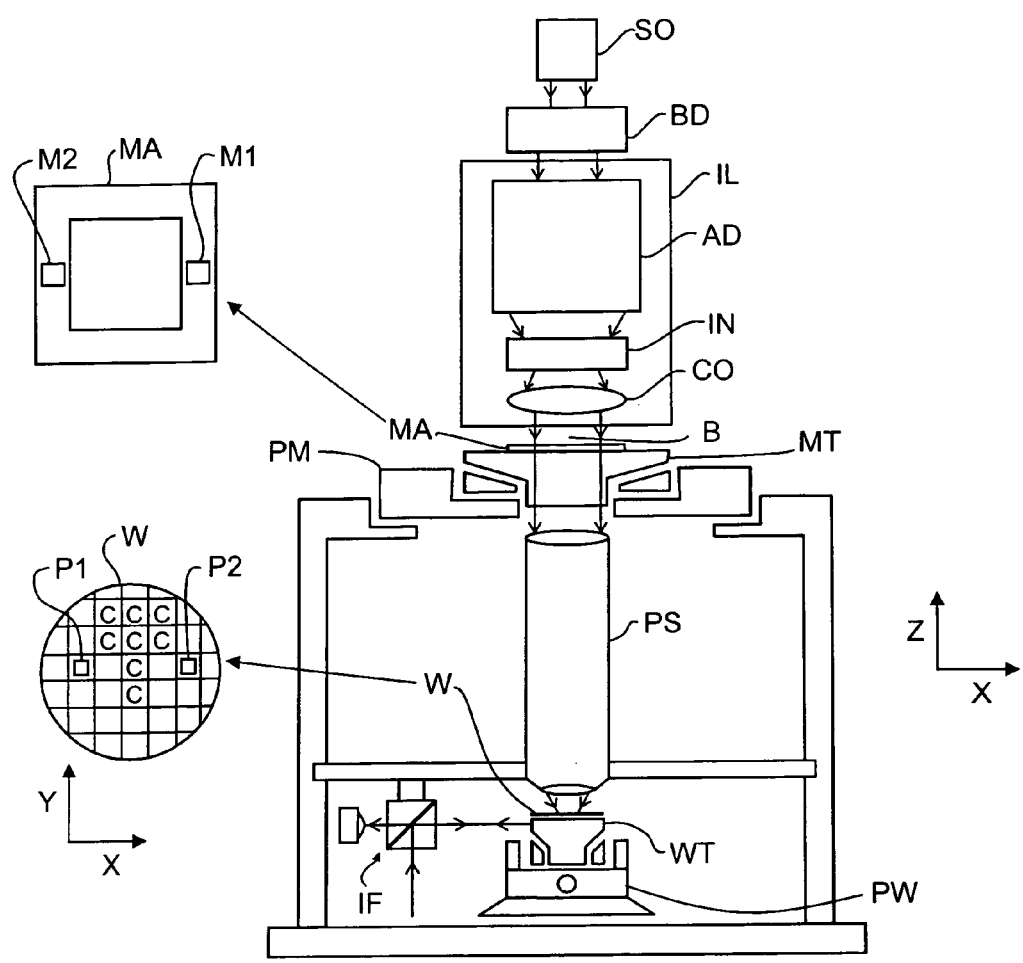
FIG. 1 depicts a lithographic apparatus according to an embodiment of the invention.

FIG. 1 schematically depicts a lithographic apparatus according to one embodiment of the invention. The apparatus includes an illumination system (illuminator) IL configured to condition a radiation beam B (e.g. UV radiation or any other suitable radiation), a mask support structure (e.g. a mask table) MT constructed to support a patterning device (e.g. a mask) MA and connected to a first positioning device PM configured to accurately position the patterning device in accordance with certain parameters. The apparatus also includes a substrate table (e.g. a wafer table) WT or "substrate support" constructed to hold a substrate (e.g. a resist-coated wafer) W and connected to a second positioning device PW configured to accurately position the substrate in accordance with certain parameters. The apparatus further includes a projection system (e.g. a refractive projection lens system) PS configured to project a pattern imparted to the radiation beam B by patterning device MA onto a target portion C (e.g. including one or more dies) of the substrate W.

The illumination system may include various types of optical components, such as refractive, reflective, magnetic, electromagnetic, electrostatic or other types of optical components, or any combination thereof, for directing, shaping, or controlling radiation.

The mask support structure holds the patterning device in a manner that depends on the orientation of the patterning device, the design of the lithographic apparatus, and other conditions, such as for example whether or not the patterning device is held in a vacuum environment. The mask support structure can use mechanical, vacuum, electrostatic or other clamping techniques to hold the patterning device. The mask support structure may be a frame or a table, for example, which may be fixed or movable as required. The mask support structure may ensure that the patterning device is at a desired position, for example with respect to the projection system. Any use of the terms "reticle" or "mask" herein may be considered synonymous with the more general term "patterning device."

The term "patterning device" used herein should be broadly interpreted as referring to any device that can be used to impart a radiation beam with a pattern in its cross-section so as to create a pattern in a target portion of the substrate. It should be noted that the pattern imparted to the radiation beam may not exactly correspond to the desired pattern in the target portion of the substrate, for example if the pattern includes phase-shifting features or so called assist features. Generally, the pattern imparted to the radiation beam will correspond to a particular functional layer in a device being created in the target portion, such as an integrated circuit.

The patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system".

As here depicted, the apparatus is of a transmissive type (e.g. employing a transmissive mask). Alternatively, the apparatus may be of a reflective type (e.g. employing a programmable mirror array of a type as referred to above, or employing a reflective mask).

The lithographic apparatus may be of a type having two (dual stage) or more substrate tables or "substrate supports" (and/or two or more mask tables or "mask supports"). In such "multiple stage" machines the additional tables or supports may be used in parallel, or preparatory steps may be carried out on one or more tables or supports while one or more other tables or supports are being used for exposure.

The lithographic apparatus may also be of a type wherein at least a portion of the substrate may be covered by a liquid having a relatively high refractive index, e.g. water, so as to fill a space between the projection system and the substrate. An immersion liquid may also be applied to other spaces in the lithographic apparatus, for example, between the mask and the projection system. Immersion techniques can be used to increase the numerical aperture of projection systems. The term "immersion" as used herein does not mean that a structure, such as a substrate, must be submerged in liquid, but rather only means that a liquid is located between the projection system and the substrate during exposure.

Referring to FIG. 1, the illuminator IL receives a radiation beam from a radiation source SO. The source and the lithographic apparatus may be separate entities, for example when the source is an excimer laser. In such cases, the source is not considered to form part of the lithographic apparatus and the radiation beam is passed from the source SO to the illuminator IL with the aid of a beam delivery system BD including, for example, suitable directing mirrors and/or a beam expander. In other cases the source may be an integral part of the lithographic apparatus, for example when the source is a mercury lamp. The source SO and the illuminator IL, together with the beam delivery system BD if required, may be referred to as a radiation system.

The illuminator IL may include an adjuster AD configured to adjust the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may include various other components, such as an integrator IN and a condenser CO. The illuminator may be used to condition the radiation beam, to have a desired uniformity and intensity distribution in its cross-section.

The radiation beam B is incident on the patterning device (e.g., mask MA), which is held on the mask support structure (e.g., mask table MT), and is patterned by the patterning device. Having traversed the mask MA, the radiation beam B passes through the projection system PS, which focuses the beam onto a target portion C of the substrate W. With the aid of the second positioning device PW and position sensor IF (e.g. an interferometric device, linear encoder or capacitive sensor), the substrate table WT can be moved accurately, e.g. so as to position different target portions C in the path of the radiation beam B. Similarly, the first positioning device PM and another position sensor (which is not explicitly depicted in FIG. 1) can be used to accurately position the mask MA with respect to the path of the radiation beam B, e.g. after mechanical retrieval from a mask library, or during a scan. In general, movement of the mask table MT may be realized with the aid of a long-stroke module (coarse positioning) and a short-stroke module (fine positioning), which form part of the first positioning device PM. Similarly, movement of the substrate table WT or "substrate support" may be realized using a long-stroke module and a short-stroke module, which form part of the second positioner PW. In the case of a stepper (as opposed to a scanner) the mask table MT may be connected to a short-stroke actuator only, or may be fixed. Mask MA and substrate W may be aligned using mask alignment marks M1, M2 and substrate alignment marks P1, P2. Although the substrate alignment marks as illustrated occupy dedicated target portions, they may be located in spaces between target portions (these are known as scribe-lane alignment marks). Similarly, in situations in which more than one die is provided on the mask MA, the mask alignment marks may be located between the dies.

The depicted apparatus could be used in at least one of the following modes:

1. In step mode, the mask table MT or "mask support" and the substrate table WT or "substrate support" are kept essentially stationary, while an entire pattern imparted to the radiation beam is projected onto a target portion C at one time (i.e. a single static exposure). The substrate table WT or "substrate support" is then shifted in the X and/or Y direction so that a different target portion C can be exposed. In step mode, the maximum size of the exposure field limits the size of the target portion C imaged in a single static exposure.

2. In scan mode, the mask table MT or "mask support" and the substrate table WT or "substrate support" are scanned synchronously while a pattern imparted to the radiation beam is projected onto a target portion C (i.e. a single dynamic exposure). The velocity and direction of the substrate table WT or "substrate support" relative to the mask table MT or "mask support" may be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

3. In another mode, the mask table MT or "mask support" is kept essentially stationary holding a programmable patterning device, and the substrate table WT or "substrate support" is moved or scanned while a pattern imparted to the radiation beam is projected onto a target portion C. In this mode, generally a pulsed radiation source is employed and the programmable patterning device is updated as required after each movement of the substrate table WT or "substrate support" or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

FIG. 2 depicts a flow diagram of a method according to an embodiment of the invention. A software process is to be performed, the process comprising a plurality of tasks. The tasks may consist of sub-processes, however any kind of division of the process in activities, procedures, program modules, program blocks, or any other part of the process, is possible and is to be understood as falling within the scope of the term task. In A, at least one task of the plurality of tasks of the process is started. A progress of the at least one started task is monitored in B.

The progress may be monitored at a predetermined moment in time or upon completion of the task. The predetermined moment in time may be established by any suitable timing means, comprising e.g. a counter or processor (e.g. a parallel processor or other processing means or timing means), e.g. operating in parallel to the performing of the task. It is thus possible that B is performed when the counter reaches a certain, predetermined value, which represents the predetermined moment in time. Then, the progress, as monitored at B, is compared in C with a desired progress. Thereby, it is thus possible to compare if the progress meets the desired progress, in other words if the progress is according to the desired progress or possibly exceeds the desired progress. In this document, the term meeting a desired progress is to be understood as reaching or exceeding the desired progress. In case more than one task has been started at A, is possible that B and C are performed for each of the tasks at a same moment in time or at different moments in time. Also, it is possible that monitoring of the progress is performed for two or more tasks simultaneously, e.g. by monitoring a total progress of these tasks together. In the embodiment wherein B has been performed at a predetermined moment in time, the comparing comprises comparing the progress with a desired progress at the predetermined moment in time. In the embodiment wherein B has been performed upon completion of the task, the comparing comprises comparing a time of completion of the task with a desired time of completion of the task. If the progress does not meet the desired progress, then in D at least a part of at least one of the tasks is skipped, e.g. based on a priority list. The tasks may for example be ranked in priority, which may be entered in a priority list. For tasks having a high priority, it is considered relevant that these tasks are performed, while for tasks having a low priority thus being low on the list, performing thereof is considered less relevant. It may thus be important for the process as a whole, that these tasks are performed. It is possible that a task (e.g. a task which has not been commenced yet) is skipped as a whole, however it is also possible that a task which has already been started, is skipped, thus is not completed any more. Also, it may be possible to skip more than one task, depending on a difference between the progress and the desired progress. The priority list may also be implied, e.g. a task which is to be performed last may imply that the task has a low priority. If a difference between the progress and the desired progress is large, then more than one task may be skipped. Then, in E, an output of the process is provided making use of an outcome of the tasks which have been completed. The output of the process may comprise any quantity or variable. It may comprise a message, an updated value of an output of the process (e.g. a controller output value or feed forward value in case of a control software etc.), any other suitable quantity, etc. Further, the output may be in any form (digital, serial, parallel, binary, analog, etc.). In E, not only an outcome of tasks that have been completed may be used for determining the output of the process, however it is also possible that tasks which have been partly completed already provide an outcome, and that this outcome may also be used in the providing of the output of the process. The providing of the output of the process making use of the outcome of the tasks which have been completed, may thus be understood to comprise the providing of the output of the process making use of the outcome of the tasks which have been at least partly completed also. According to an embodiment of the invention, it is possible that A-E are repeated, thus providing for a repetitive performing of A-E. Such repetition may for example be advantageous to provide a periodic output of, for example, a controller implemented in software, of a communication process which is required to provide an output at certain, repetitive moments in time, or any other process.

In general, the method as described with reference to FIG. 2 may provide as an advantage that an unacceptable delay in providing an output of the process may be prevented, as in a case that, due to any kind of reason, some kind of delay occurs causing one or more tasks of the process to be behind a schedule, by skipping at least a part of at least one of the tasks to be able to provide the output of the process in time. When the software process comprises a controller, the controller may become more robust as well as more deterministic. The embodiment where the progress is monitored upon completion of a task may be advantageous in case that tasks are performed consecutively: in that case, the steps as described at B, C and D may be performed between consecutive tasks, allowing, for example, a simple implementation: as an example, the steps B-D may in that case be performed in between consecutive tasks making use of, for example, a same processing means for performing B-D as the processing means which performs the task(s). In the embodiment where the progress is monitored at the predetermined moment in time, more versatility and flexibility in skipping a task or a part thereof may be offered: in case that a task takes a long time, monitoring at the predetermined moment in time may provide for an indication that the task is behind the desired progress at an early stage before completion of that task. Therefore, corrective actions by, for example, skipping a task or a part thereof may be taken already at that moment in time, and thus do not have to wait until the task is completed. The embodiments where the progress is monitored at the predetermined moment in time may, for example, be advantageous in a multi-processor environment where multiple processing means (such as microprocessors, microcontrollers, etc.) are running in parallel: in that case, for example, one of the processing means could be applied for performing the monitoring, comparing, etc. steps as described above for tasks running on one or more other processing means.

FIGS. 3A-3C depict a timing diagram of a process comprising a plurality of tasks. In this example, the process comprises four tasks, numbered in FIG. 3A as 1, 2, 3 and 4. Along a horizontal axis of FIGS. 3A-3C, a time is depicted. A clock signal CLK is provided which indicates a time period within which the process needs to be completed. According to an embodiment of the invention, the process may be repeated, thus each time after occurrence of the clock signal CLK, the process may be started. As indicated in FIG. 3A, the process P comprises tasks 1, 2, 3 and 4 which are in this example performed consecutively. Of course, it may also be the case that one or more of these tasks 1, 2, 3 and/or 4 are performed in parallel or partly in parallel to each other. Thus, it may be possible that tasks 1 and 2 are started simultaneously, or it may be the case that first task 1 is started and at a certain moment in time, before task 1 has been completed, task 2 is started also and task 1 and 2 run in parallel for some time, etc. The term parallel is in this context to be understood as parallel in terms of execution of software: this term may thus include the situation that a single processing means in turn performs some activities for one of the tasks and then for another one of the tasks, e.g., putting the task which is at rest at a certain moment in time in a memory, such as a cache memory. Also, parallel may include the case where tasks are performed on parallel processing means. In the example shown in FIG. 3A, task 1 is started after occurrence of the clock CLK. At a certain moment in time, indicated by MON1, a progress of task 1 is monitored, i.e. determined. The progress is compared with a desired progress at the moment indicated by MON1. In this case, the progress meets the desired progress so that no skipping of tasks is required. After task 1 has been completed, task 2 of the process is started and completed followed by a starting of task 3 of the process P. At a second moment in time indicated by MON2, the progress of the task is again monitored, showing that task 1 and 2 have been completed while task 3 is in progress (it may even be the case that the monitoring provides for an indication about the extent to which the task 3 has been completed). Also the monitoring shows that task 4 has not yet been started. As again the progress is according to the desired progress, no skipping of tasks is required. After completion of task 3, task 4 of the process is started and during the performing of task 4, again progress is monitored at MON3. At this moment, the monitor shows that tasks 1, 2 and 3 have been completed, while task 4 is in progress, e.g. providing details about the extent to which task 4 has been completed. As again the progress meets the desired progress, no skipping of tasks is required. After completion of task 4, at a moment in time indicated by PERF, the process provides an output, e.g. performs an action, making use of the outcome of the tasks 1, 2, 3 and 4 of the process P. Then, again the clock signal is provided, which may according to an embodiment of the invention trigger a starting of one or more tasks of the process again. FIGS. 3B and 3C will now show examples of the process as described with reference to FIG. 3A, in which due to a delay, skipping of a task or a part thereof is required. In FIG. 3B, a delay occurs during the performing of task 1 of the process B. After completion of task 1, task 2 and task 3 are performed. When monitoring the progress of the tasks, at MON1, a progress of task 1 is monitored which appears behind the schedule i.e. behind the desired progress. At this moment, in this example no skipping of tasks is performed yet, as it might at that moment in time still be possible to complete the tasks 1 to 4 of the process P. At MON2, the monitoring shows that task 1 is completed however that task 2 is not completed yet, while task 3 has not even begun. At MON2, in this example the time left for completion of tasks 3 and 4 may be too short. Therefore, it may at this moment in time be decided to skip one of the tasks of the process. In this example, a priority list is provided, in which task 1 is at a highest priority, followed by tasks 2, 3 and 4. Task 4 is at the lowest priority. Alternatively, a task or tasks which are to be performed last (in this example task 4) may be skipped first. As the time left before the moment in time indicated by PERF at which an output of the process is to be provided, is too short, it is decided now to skip the task with the lowest priority, i.e. in this example task 4. After completion of task 2, task 3 is started and completed. Then, at the moment in time indicated by PERF, an output of the process is provided making use of an outcome of the tasks 1, 2 and 3. Also, it may be possible to make use of an outcome of a previous performance of task 4, which might be useful depending on the application and the kind of the process, as will be understood by the skilled person.

A further example of a performing of the process as described with reference to FIGS. 3A and 3B will now be described with reference to FIG. 3C. As described above, after the moment in time indicated by CLK, the process P is started. Similarly to the situation as described with reference to FIG. 3B, a delay occurs which causes a completion of task 1 of the process to be late. Also, a delay in task 2 of the process occurs. Due to further delays only a part of task 3, indicated here as 3a, may be completed. At the moment in time indicated by MON1, it is monitored that task 1 is running behind schedule. No skipping of tasks is performed yet. At MON2, it appears that task 1 has been completed while task 2 is running and approximately half way. At this moment, comparing progress to the desired progress, it appears that there will be insufficient time to complete tasks 1-4, and at this moment in time it is decided to skip task 4 as it has in this example the lowest priority. Then, at the moment in time indicated by MON3, again progress of the process P is monitored. At this moment, it appears that task 1 and 2 have been completed while task 3 is in progress, however still in an early stage thereof. As the time left may be insufficient to complete task 3, it is decided at this moment in time to skip a part of task 3, a remainder of task 3 being indicated as 3a in FIG. 3C. Now at the moment in time indicated by PERF, the output of the process is provided making use of an outcome of tasks 1 and 2 as well as an outcome of a part of task 3, indicated here as task 3a. As shown in the examples according to FIGS. 3B and 3C, an output of the process P is provided at the time indicated by PERF, despite the delay in a performing of one or more of the tasks thereof, in whole or in part. When, upon monitoring the progress, it appears that the process is behind schedule, a task or a part thereof having a low priority may be skipped to ensure that the output of the process is in time. In the example shown in FIGS. 3A-3C, a priority list of task 1, task 2, task 3, task 4 is used wherein task 1 has a highest priority and task 4 has a lowest priority. It may however equally well be the case that other priority lists are applied, e.g. 1, 2, 4, 3. Thus, in case that such a priority list would have been applied, instead of skipping task 4 in the example described with reference to FIG. 3B, task 3 might have been skipped, thus performing tasks 1, 2 and 4 in the example described with reference to FIG. 3B. In general, no relationship is to be assumed between an order of execution of tasks and a priority thereof, however, it might in some applications be advantageous to perform one or more tasks having a high priority first followed by one or more tasks having a lower priority or to derive priority of the tasks from the order of execution as also described in this document.

Another example of the method as described with reference to FIG. 2 will now be described with reference to FIGS. 4A-4C. In the examples shown in FIGS. 4A-4C, the process P is split up in two parts, a process part P1 and a process part P2. After the moment in time at which the clock signal CLK is provided, process part P1 is started. In a desired situation, process part P1 is completed before the moment in time indicated by PERF. At the moment PERF, an output of the process is provided. For this output, use is made of an outcome of tasks belonging to the process part P1 which has just been completed in the desired case, supplemented by an outcome from one or more tasks comprised in process part P2 which have been executed in a previous cycle. According to an embodiment, the process comprising P1, P2 is repeated after each clock signal CLK. After the clock signal, first process part P1 is performed in full or in part as will be described below, followed by the providing of the output at the moment in time PERF, and then in a remainder of the cycle between 2 consecutive clock pulses CLK, process part P2 is performed in part or in full. An outcome of tasks comprised in process part P2 may be used in a following cycle or even in a later cycle. It is possible that time critical tasks are comprised in process P1, while non-time critical or less time critical tasks are comprised in process P2. As an example, a task in process P1 may included a feed back in a controller. In a feedback loop it is desired to obtain an output signal to drive, for example, an actuator within an as short as possible time from providing of a signal by, for example, a sensor, thereby reducing a delay in a control loop. As an example, presume that such an input signal, e.g., a signal from a sensor, is available at CLK, then it is desirable to provide the outcome of the process within an as short as possible time from CLK. This may be achieved by splitting up the process P in process parts P1 and P2. At the moment in time CLK, non-time critical tasks have been performed as a part of P2 in one or more previous cycles, and thus are available before CLK. At CLK, input from a time critical source, such as a position sensor or other sensor or other timing information, also becomes available which is then processed in the tasks comprised in P1 and an output being generated at PERF. Thus, a lead time for time critical tasks may be reduced. A division between time critical and non-time critical tasks may be made per application. In general however, non-time critical tasks may include any task which is relatively non-time bound, i.e. a skipping or a delay in performing of that task may have (within certain boundaries) a relatively low impact on the performance of the process. On the other hand, time critical tasks may include tasks a delay of which may have adverse effects on a performance of the process. In this context, the delay may include any time delay, i.e. a scheduled delay as well as an unexpected delay by any cause, etc. In the examples shown in FIGS. 4A-C, a progress is monitored twice during performing the first process part P1 at the moments in time MON1, MON2. During performing the process part P2, progress is monitored twice also, being at the moments in time MON3 and MON4. In this example, the process part P1 comprises tasks 5 and 6 while the process part P2 comprises tasks 7 and 8. In FIG. 4A, the tasks are on schedule. The tasks 5 and 6 are completed before PERF and tasks 7 and 8 are completed in a remainder of the cycle. In the example shown in FIG. 4B, task 5 is delayed which causes a skipping of task 6, as insufficient time would be left before the moment in time PERF to complete task 6 (or at least to perform a relevant part thereof). Also with the performing of P2, some delay occurs, however this delay is relatively small causing tasks 7 and 8 to be completed. In example shown in FIG. 4C, some delay is present in task 6, however sufficient time is left to complete tasks 5 and 6. During performing of task 7 however a delay occurs which causes a skipping of a part of task 8, a remainder of task 8 being indicated by 8a. In FIGS. 4A-4C, the progress of the respective tasks is monitored at MON1 throughout MON4, and compared with a desired progress, and then it is decided whether or not to skip (a part of) at least one of the tasks based on, for example, a priority list. In this example, task 7 has a higher priority than task 8, and task 5 has a higher priority than task 6.

FIG. 5 shows an example of a priority list. In this example, an exemplary embodiment of a priority list for a position controller of a lithographic apparatus is depicted, e.g. a substrate table position controller. The priority list is in FIG. 5 depicted as a table showing a plurality of tasks. A task at a top of the table has a high priority while a task at a bottom of the table has a low priority. In this example, a high priority has been assigned to feed forward signals, followed by a short stroke positioning (i.e. an accurate positioning having a short stroke), followed by a proportional, integrative, differential controller or other type of controller from a part of a feedback mechanism configured to control a position of the substrate table. Again a lower priority may be assigned to a long stroke positioning, thus a coarse positioning having a long stroke. Also it is possible, instead of or in addition to the priority list provided here, to assign different priorities to tasks which are related to different dimensions. It is, for example, imaginable that a direction of scanning obtains a higher priority than other directions which may, for example, be perpendicular thereto. The priority list may have any form and may be stored in any way. As an example, the priority may be implied by an order of execution of tasks: A task executed first (e.g. in a cycle) may have a highest priority while a task executed last may have a lowest priority. Furthermore, in any of the examples above, a priority list may be omitted, a skipping of tasks may then be performed by skipping one or more tasks or task parts which are to be executed last in the clock cycle between clock signals CLK.

FIG. 6 shows a further example of a timing diagram showing a performing of a process according to an embodiment of the invention. For a general meaning of the terms CLK and PERF, reference is made to the description of FIGS. 3 and 4. Monitoring is performed at MON1, MON2 and MON3. A difference between the examples as depicted in and described with reference to FIGS. 3 and 4, is that the monitoring is performed upon completion of a task instead of at the predetermined moments in time as described with reference to FIGS. 3 and 4. In FIGS. 6A-6C, the process P comprises tasks 11, 12 and 13. Tasks 11, 12 and 13 are performed consecutively in this example. As depicted in FIG. 6A, after performing task 11, progress is monitored at MON1, after performing task 12, progress is monitored at MON2, and after performing task 13, progress is monitored at MON3. Then, after completion of the tasks 11, 12 and 13, the output of the process is provided at PERF. In the example according to FIG. 6A, the performing of the tasks 11, 12 and 13 is considered in time.

In the example shown in FIG. 6B, task 11 is slightly delayed as compared to the example shown in FIG. 6A, causing MON1 to be somewhat later in time. In this example, the monitoring of the progress may comprise a comparing of the actual time lapsed since the last occurrence of CLK, to a desired lapsed time since the last occurrence of CLK. As delay is small at that moment, no skipping is performed yet and task 12 is started. Upon completion of task 12, progress is monitored at MON2, showing that substantial delay has occurred leaving insufficient time to complete task 13 before PERF. Therefore, only a part of task 13 is started, indicated here as 13a, i.e. a part of task 13 is skipped. After completion of task part 13a, progress is monitored again at MON3. As insufficient time is left for performing other parts of task 13, no further task parts are started. At PERF, an output of the process is provided making use of an outcome of tasks 11 and 12 and task part 13a.

In FIG. 6C, task 11 is substantially delayed, causing the monitoring at MON1 to be late. Therefore, it may be decided at that moment in time already that task 13 will be skipped, as insufficient time will be left before PERF to perform tasks 12 and 13. After completion of task 12, which is in this example delayed again, progress is monitored at MON2. No further tasks are performed in this example due to the little amount of time left before PERF. An advantage of the embodiment depicted and described with reference to FIGS. 6A-C is its simplicity of implementation: as the monitoring may be performed upon completion of a task, separate timing processors, interrupt routines or other provisions for indicating the predetermined moments in time may be omitted to a large extent. Therefore, the embodiment shown in and described with reference to FIGS. 6A-C may provide for a simple implementation yet offering one or more of the advantages described herein. Furthermore, in the examples shown in FIGS. 6A and 6B, the monitoring at MON3 may be omitted as a further simplification.

An embodiment of the invention may not only be implemented in a form of a method, but also or alternatively implemented as a controller configured to perform a control process. The controller may comprise program instructions to perform the method as described herein. Similarly, an embodiment of the invention may comprise a lithographic apparatus, for example, comprising a controller configured to perform a control process. The lithographic apparatus or the controller may be provided with program instructions to perform the method as described herein.

An embodiment of the invention is particularly suited for a lithographic apparatus as performance requirements in a lithographic apparatus may be high and time critical, providing a particular benefit from the one or more advantages described herein. Nevertheless, an embodiment of the invention may be put into practice for any application in which performance of the software is, for example, time critical, e.g., in any real time control environment.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, liquid-crystal displays (LCDs), thin-film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist), a metrology tool and/or an inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

Although specific reference may have been made above to the use of embodiments of the invention in the context of optical lithography, it will be appreciated that the invention may be used in other applications, for example imprint lithography, and where the context allows, is not limited to optical lithography. In imprint lithography a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

The terms "radiation" and "beam" used herein encompass all types of electromagnetic radiation, including ultraviolet (UV) radiation (e.g. having a wavelength of or about 365, 248, 193, 157 or 126 nm) and extreme ultra-violet (EUV) radiation (e.g. having a wavelength in the range of 5-20 nm), as well as particle beams, such as ion beams or electron beams.

The term "lens", where the context allows, may refer to any one or combination of various types of optical components, including refractive, reflective, magnetic, electromagnetic and electrostatic optical components.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein.

The descriptions above are intended to be illustrative, not limiting. Thus, it will be apparent to one skilled in the art that modifications may be made to the invention as described without departing from the scope of the claims set out below.

What is claimed is:

1. A method for performing a software process, the process comprising a plurality of tasks, the method comprising:
   starting a task of the plurality of tasks of the process;
   monitoring a progress of the started task;
   comparing the progress with a desired progress;
   if the progress does not meet the desired progress, skipping at least a part of a task of the plurality of tasks based on a priority list; and
   providing an output of the process making use of an outcome of the tasks which have been completed;
   wherein the software process comprises a combined long stroke-short stroke position controller of a lithographic apparatus substrate table, a short stroke position controlling task of the position controller being ranked higher in priority on the priority list than a long stroke position controlling task of the position controller and wherein the position controller comprises a proportional, integrating, differential controller, a priority of the proportional, integrating, differential controller being lower than the priority on the priority list of the position controller.

2. The method according to claim 1, wherein monitoring a progress of the started task is performed at a predetermined moment in time, and wherein the desired progress comprises a desired progress at the predetermined moment in time.

3. The method according to claim 1, wherein monitoring a progress of the started task is performed upon completion of the task, and wherein comparing the progress with a desired progress comprises comparing a time of completion of the task with a desired time of completion of the task.

4. The method according to claim 1, wherein a cycle comprising the starting, monitoring, comparing, skipping if the progress does not meet the desired progress, and providing steps is repeated.

5. The method according to claim 4, wherein each repetition of the cycle is performed in a fixed time interval.

6. The method according to claim 4, wherein, when a task has been at least partly skipped if the progress does not meet the desired progress, an outcome of a previous performing of the same task is used as the outcome of the task in providing an output of the process making use of an outcome of the tasks which have been completed.

7. The method according to claim 4, wherein, when a task has been at least partly skipped if the progress does not meet the desired progress, an outcome of that task is skipped in providing an output of the process making use of an outcome of the tasks which have been completed.

8. The method according to claim 4, wherein the plurality of tasks comprises a subset of tasks which are time critical and a remainder of the tasks, a repetition of the remainder of the tasks being performed at an earlier repetition of the cycle to provide an outcome to the following cycle or a later cycle.

9. The method according to claim 4, wherein the monitoring, comparing, and skipping if the progress does not meet the desired progress steps are repeated within each cycle.

10. The method according to claim 1, wherein the software process comprises a feed forward-feedback controller, a feed forward task of the feed forward-feedback controller being ranked higher in priority on the priority list than a feedback task of the feed forward-feedback controller.

11. The method according to claim 1, wherein a priority of a task of the position controller to control a position of the substrate table in a scanning direction is higher than in another direction.

12. The method according to claim 1, wherein the software process comprises a real-time control process.

13. A controller configured to perform a software process, the process comprising a plurality of tasks, the controller comprising program instructions to perform the method according to claim 1.

14. The method of claim 1, further comprising:
   controlling at least a portion of a lithographic apparatus with the output.

15. The method of claim 14, wherein the using step comprises:
   controlling a servo-control loop of a substrate table of the lithographic apparatus with the output.

16. A method for performing a software control process in a lithographic apparatus, the process comprising a plurality of tasks, the method comprising:
   starting a task of the plurality of tasks of the process;
   monitoring a progress of the started task;
   comparing the progress with a desired progress;
   if the progress does not meet the desired progress, then:
      selecting another task different from the started task based on a priority associated with the started task; and
      skipping at least apart of the other task;
   providing an output of the process making use of an outcome of the tasks which have been completed; and
   controlling at least a portion of the lithographic apparatus with the output.

17. The method according to claim 16, wherein monitoring a progress of the started task is performed at a predetermined moment in time, and wherein the desired progress comprises a desired progress at the predetermined moment in time.

18. The method according to claim 16, wherein monitoring a progress of the started task is performed upon completion of the task, and wherein comparing the progress with a desired progress comprises comparing a time of completion of the task with a desired time of completion of the task.

19. The method according to claim 16, wherein a cycle comprising the starting, monitoring, comparing, skipping if the progress does not meet the desired progress, and providing steps is repeated.

20. The method according to claim 19, wherein each repetition of the cycle is performed in a fixed time interval.

21. The method according to claim 19, wherein, when a task has been at least partly skipped if the progress does not meet the desired progress, an outcome of a previous performing of the same task is used as the outcome of the task in providing an output of the process making use of an outcome of the tasks which have been completed.

22. The method according to claim 19, wherein, when a task has been at least partly skipped if the progress does not meet the desired progress, an outcome of that task is skipped in providing an output of the process making use of an outcome of the tasks which have been completed.

23. The method according to claim 19, wherein the plurality of tasks comprises a subset of tasks which are time critical and a remainder of the tasks, a repetition of the remainder of the tasks being performed at an earlier repetition of the cycle to provide an outcome to the following cycle or a later cycle.

24. The method according to claim 19, wherein the monitoring, comparing, and skipping if the progress does not meet the desired progress steps are repeated within each cycle.

25. The method according to claim 16, wherein the skipping of at least a part of a task of the plurality of tasks is performed based on a priority list.

26. The method according to claim 25, wherein the software process comprises a feed forward-feedback controller, a feed forward task of the controller being ranked higher in priority than a feedback task of the controller.

27. The method according to claim 25, wherein the software process comprises a combined long stroke-short stroke position controller of a lithographic apparatus substrate table, a short stroke position controlling task of the controller being ranked higher in priority than a long stroke position controlling task of the controller.

28. The method according to claim 25, wherein the position controller comprises a proportional, integrating, differential controller, a priority of the proportional, integrating, differential controller being lower than the priority of the short stroke controller.

29. The method according to claim 25, wherein a priority of a task of the position controller to control a position of the substrate table in a scanning direction is higher than in another direction.

30. The method according to claim 16, wherein the software process comprises a real-time control process.

31. A lithographic apparatus comprising a controller configured to perform a software process, the process comprising a plurality of tasks, the controller comprising program instructions to perform the method according to claim 16.

32. The method of claim 16, wherein the using step comprises:
controlling a servo-control loop of a substrate table of the lithographic apparatus with the output.

* * * * *